May 28, 1940.　　　　H. E. KITCHEN　　　　2,202,587
GRINDING MACHINE
Filed March 31, 1939　　　2 Sheets-Sheet 1
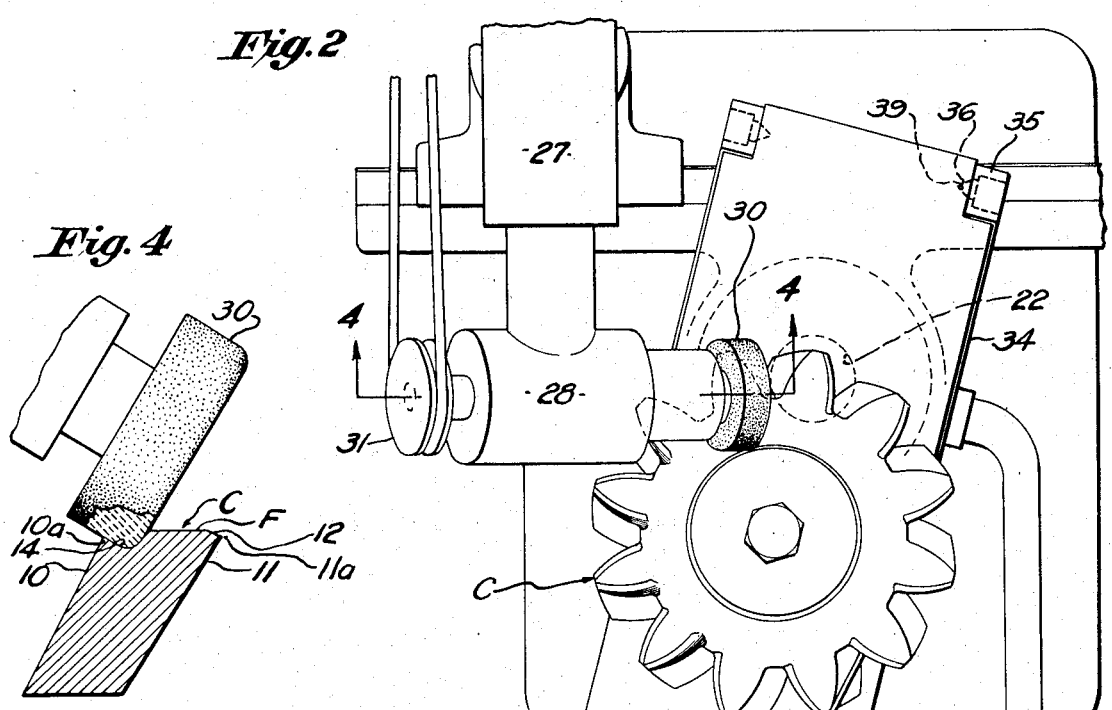
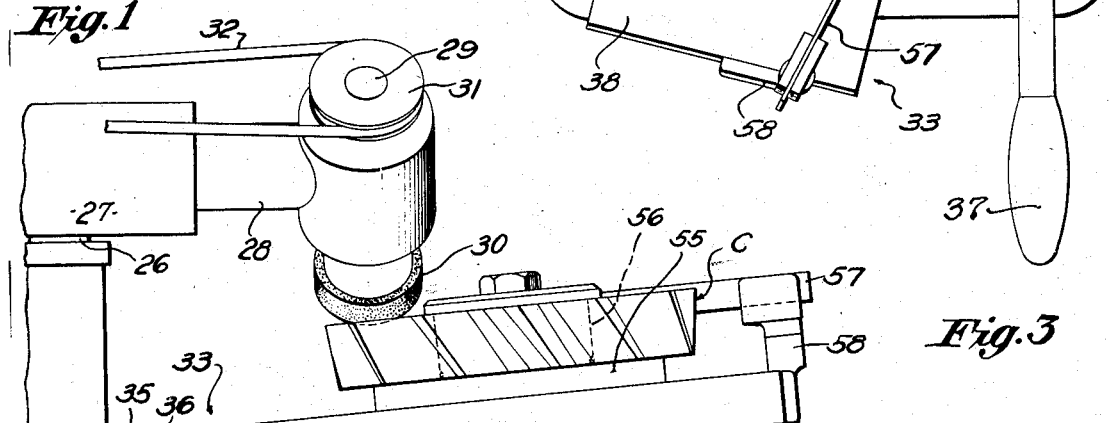
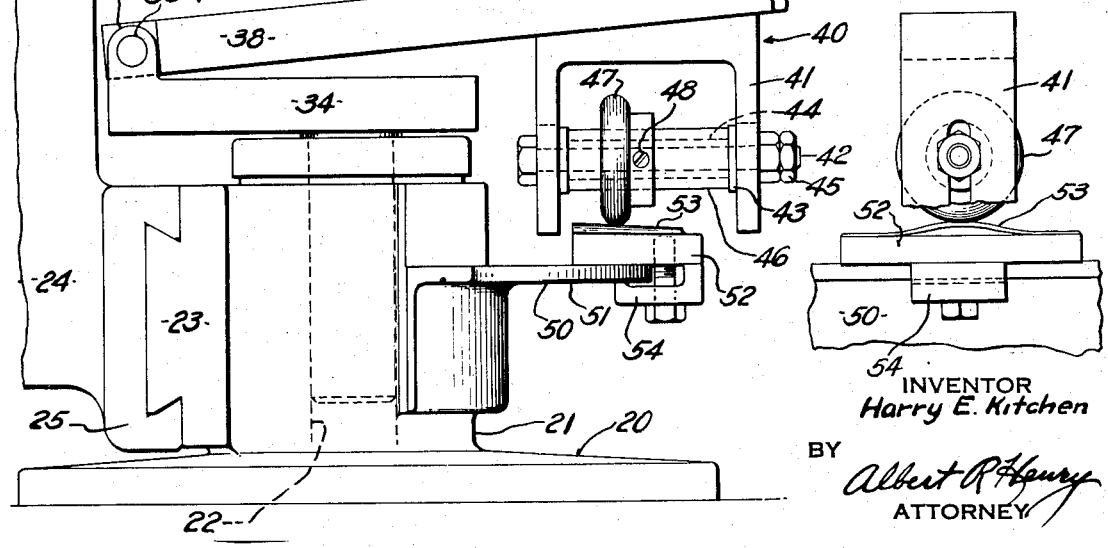
INVENTOR
Harry E. Kitchen
BY
Albert R. Henry
ATTORNEY May 28, 1940.　　　　H. E. KITCHEN　　　　2,202,587
GRINDING MACHINE
Filed March 31, 1939　　　2 Sheets-Sheet 2
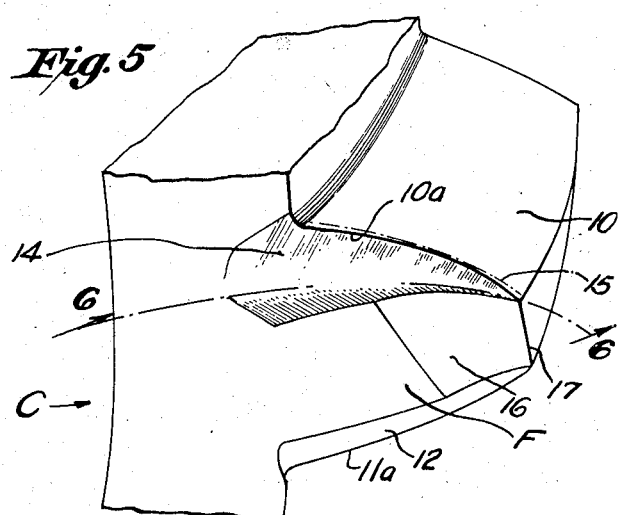
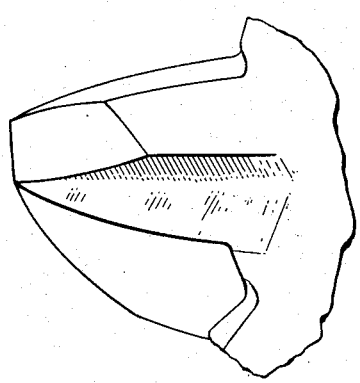
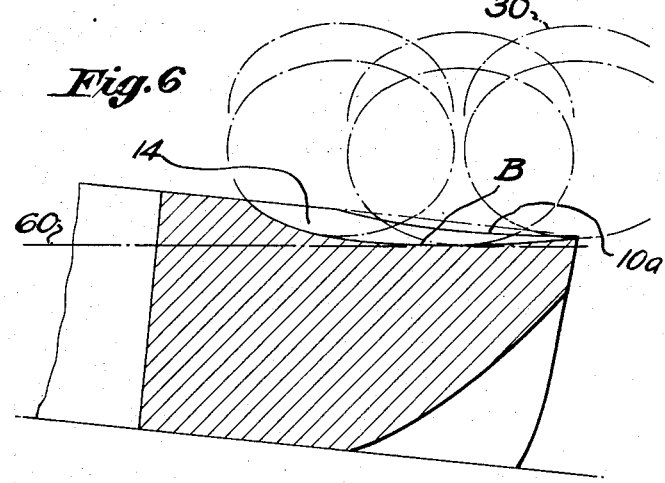
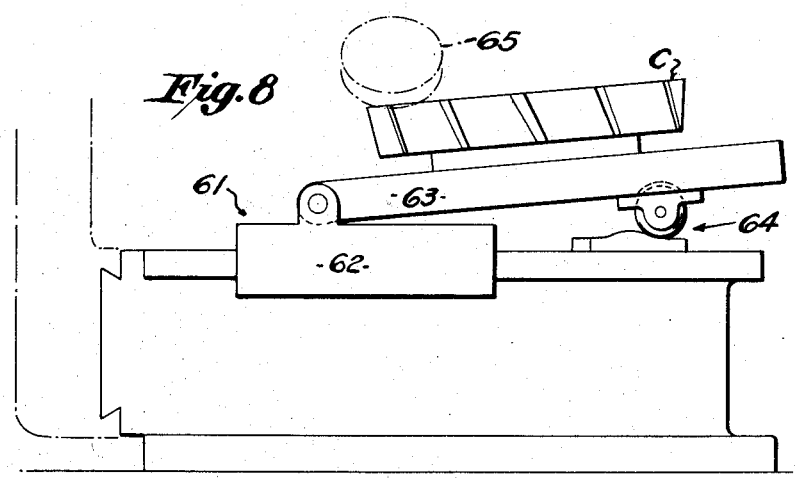
INVENTOR
Harry E. Kitchen
BY
ATTORNEY Patented May 28, 1940

2,202,587

UNITED STATES PATENT OFFICE 2,202,587

GRINDING MACHINE

Harry E. Kitchen, Buffalo, N. Y., assignor to Farrel-Birmingham Company, Inc., Buffalo, N. Y.

Application March 31, 1939, Serial No. 265,194

3 Claims. (Cl. 51—96)

This invention relates to a machine for grinding the cutting edges of cutters which are used in the shaping-generating process of forming gears.

The machine is particularly devised to perform the grinding operations demanded in the production of the type of cutters disclosed in copending application Serial No. 248,460, filed December 30, 1938. In said copending application, an improved form of double helical or Sykes type gear is disclosed, together with the cutters for producing the same, which cutters include cutting edges of modified involute form. The present invention provides an accurate and practical method of grinding such edges, either in the original production of new cutters or in resharpening dull cutters, as is more fully set forth in the accompanying specification and drawings, wherein:

Fig. 1 is a side elevation of the grinding machine;

Fig. 2 is a top view thereof;

Fig. 3 is a fragmentary end view showing particularly the cam action of the cutter supporting table;

Fig. 4 is an enlarged section through the grinding wheel and cutter tooth, taken on the line 4—4 of Fig. 1;

Fig. 5 is an enlarged fragmentary perspective view of a completely ground cutter tooth;

Fig. 6 is a section taken on the curved line 6—6 of Fig. 5, showing diagrammatically several positions of the grinding wheel during the hollow grinding process;

Fig. 7 is a perspective view of a cutter tooth whose obtuse edge is ground through a relative lineal movement of the grinding wheel; and Fig. 8 is a diagrammatic side elevation of a machine for producing the cutter of Fig. 7.

A typical cutter C of the helical type mentioned is best illustrated in Figs. 4 to 6, where it will be observed that the cutting face F of each tooth includes tapered obtuse and acute flanks 10 and 11 respectively (Fig. 4), resulting from the original helical formation of the teeth plus a slight clearance angle. As is well known in the art, the acute flank 11 is ground to a cutting angle of somewhat less than 90 degrees by grinding a suitable facet 12 in the tooth face. The cutting edge 11a thus provided lies accurately in a plane normal to the face of the cutter.

The grinding of the obtuse flank 10 is the particular concern of the present machine, and as will be observed in Fig. 5, the cutting edge 10a thereof is defined by a face groove 14 of toric shape. This edge differs from the edge 11a in that it is concave relative to the plane of the cutter face. The dot and dash line 15 (Fig. 5) indicates a projection of the plane of the edge 11a, and it affords comparison with the relatively curved edge 10a. After the facet 12 and groove 14 are ground, a third and final grinding operation forms a facet 16 which defines a tip cutting edge 17.

The machine includes a grinding unit and an underlying cutter jig unit, and it will be understood that, with slight modification, many of the adjustable grinding machines known in the art may be substituted for the grinding unit herein disclosed. Both units are supported on a fixed pedestal 20 having a hub 21 which contains a vertical bearing 22. An integral horizontal slide 23 is formed on the rear of the pedestal, and it serves as a support for a grinder standard 24 which is formed with a complementary gib portion 25. The standard 24 carries a radially adjustable post 26 having a horizontal bearing 27, which bearing in turn carries a rotatably and axially adjustable grinding head 28. The extremity of the head 28 incorporates a suitable transverse bearing structure for receiving a grinding wheel shaft 29, upon one extremity of which a grinding wheel 30 is fastened. The opposite extremity of the shaft 29 carries a pulley 31, which is connected to a suitable source of power (not shown) by a belt 32. It will be apparent that with the aid of the several adjustments, the grinding wheel 30 may be fixed in any desired angular or spacial position relative to the bearing 22 for operating on an underlying cutter.

In Figs. 1 to 3, the cutter is mounted for arcuate movement beneath the grinding wheel by an oscillatable head 33 which includes a table 34 having a depending shaft rotatably carried in the bearing 22. At its rear margin, the table 34 is formed with spaced upstanding lugs 35, in each of which a projecting pintle 36 is fastened. A handle 37 is secured to one side of the table 34 to facilitate manual oscillation thereof. The rear extremity of a plate 38 is received between the lugs 35, and the plate 38 is formed with bearings 39 for receiving the pintles 36. Thus, the plate 38, although constrained to be rotated with the table 34, may, when desired, be given an additional vertical hinging movement about the pintles 36.

A bracket 40 is fastened beneath the projecting end of the plate 38, and it is formed with slotted depending legs 41. A bolt 42 having washers 43 and a spacing bushing 44 thereon, is entered in the slotted legs and clamped thereto by lock nuts 45. A sleeve 46 is rotatably carried on the bushing 44, and such sleeve 46 serves as a hub for a cam roller 47. The roller 47 may be secured in various axial positions on the sleeve 46 by a lock screw 48.

A radially formed angle member 50 is secured to the front of the pedestal hub 21, and its horizontal leg 51 is disposed immediately under the roller 47. A cam 52 (Fig. 3), having a raised surface 53, is disposed on the upper face of the leg 51, and it may be fixed in any radial position thereon by a clamp 54. The cam 52 is fashioned so that it actually is a small sector of a cone whose center is the axis of rotation of the table. Thus, the described axial adjustment of the cam roller 47 permits the selective positioning thereof on higher or lower lift portions of the cam 52.

A spindle member 55 is secured to the plate 38, and it is formed with a shank 56 upon which a cutter C is rotatably positioned. The cutter is releasably held in a fixed rotative position under the grinding wheel by an indexing device consisting of a flexible finger 57 secured in a bracket 58 on the plate 38. The finger 57 engages the acute edge of one tooth and the flank of an adjacent tooth, and thus firmly positions the cutter against rotation during each grinding operation. Upon completion of each grinding operation, the cutter is rotated one tooth space, during which the finger is flexed sufficiently to enter the adjacent tooth gap.

It will be observed in Fig. 2 that the tooth being ground is spaced from the vertical center of rotation of the plate 38, and thus as the plate and table assembly are oscillated, a radial groove is ground in the face of the tooth (Fig. 4) which groove is modified to match substantially the contour of the tooth by adjusting the plate 38 to the proper normal angle by raising or lowering the supporting cam roller 47. To obtain the additional hollow grinding feature previously mentioned, the cam 52 is located so that the passage of the roller 47 over the high point on the cam face 53 is coincident with the passage of the pitch zone of the tooth under the grinding wheel. Thus, as the cutter head is manually oscillated through the short grinding arc, the plate 38 rises and falls under guidance of the cam 52. As best illustrated in Fig. 6, it will be seen that the bottom B of the groove is accordingly curved relative to the theoretical horizontal plane, as indicated by the dotted line 60. Other portions of the groove, including the cutting edge 10a, are likewise of concave character.

The machine may be easily adjusted to grind the facets 12 and 16, in which case the hollow grinding feature is not necessary, and the cam 52 may be removed and replaced by a flat member.

In cutters having comparatively small diametral pitches, it is often possible to grind a straight groove, as in Fig. 7, without sacrificing the indicated characteristics. In producing a groove of this type, a machine such as shown diagrammatically in Fig. 8 may be used. This machine is basically similar to that of Fig. 1, with the exception that the cutter head 61 is formed with a carriage 62 which is mounted in slides to provide for lineal movement thereof. The carriage has a pivoted cutter plate 63 attached to it, and such a plate is raised and lowered, as in the first embodiment, by a cam and roller arrangement 64. The grinding wheel 65 is similarly fixed for rotation in the desired angular position.

It will be understood by those skilled in the art that the grinding procedure herein described provides an advantageous relation between the grinding wheel and work, which permits repeated resharpening by the same apparatus without complications of any nature. Additionally, the machine is sufficiently flexible in adjustment of grinding wheel and cutter head to encompass in its range the grinding of cutters of all the commonly used pressure and helix angles.

It is not intended that the invention be limited to the precise forms of mechanical elements disclosed, as it will be obvious that the desired relative movement of the grinding wheel and work may be produced in other manners without departing from the inventive concept.

I claim:

1. A grinding machine having in combination a grinding wheel, a head, means for mounting said head for oscillating movement beneath said wheel, a cutter supporting plate carried for hinged movement by the head on an axis transverse to the axis of oscillation of the head, a cam roller carried by the plate, cam means engaged by the roller during movement of the head for gradually raising and lowering the plate during movement of the head in each direction, and adjusting means organized with said cam means for varying the normal angle of the hinged plate relative to the axis of oscillation of the head.

2. A grinding machine having in combination a grinding wheel, a head, means for mounting said head for oscillating movement beneath said wheel, a cutter supporting plate carried for hinged movement by the head on an axis transverse to the axis of oscillation of the head, a cam roller carried by the plate, a stationary cam supporting the roller and plate and formed to cause the uniform raising and lowering of the hinged plate during movement of the head in each direction.

3. A grinding machine having in combination a grinding wheel, a head, means for mounting said head for oscillating movement beneath said wheel, a cutter supporting plate carried for hinged movement by the head on an axis transverse to the axis of oscillation of the head, a cam roller carried by the plate and mounted on a radial axis relative to the axis of oscillation of said head, means for adjusting the roller axially, and a fixed cam upon which said roller rides, said cam having a radially variable rise.

HARRY E. KITCHEN.